Patented Nov. 26, 1946

2,411,583

UNITED STATES PATENT OFFICE 2,411,583

COMPOUNDED LUBRICATING OIL

John G. McNab, Cranford, and Carl Winning, Westfield, N. J., assignors to Standard Oil Development Company, a corporation of Delaware No Drawing. Application March 3, 1943, Serial No. 477,842

8 Claims. (Cl. 252—33)

This invention relates to mineral oils and other organic compositions and to methods of preparing the same, and more particularly to mineral lubricating oil compositions suitable for use as crankcase lubricants for internal combustion engines.

It is known that the addition of certain types of metal compounds to lubricating oils improves various properties thereof, such as their oiliness characteristics and their performance in engines, particularly the maintenance of a clean engine condition during operation. Various metal compounds which have been used for such purposes include the metal derivatives of organic compounds, such as fatty acids, naphthenic acids, alcohols, phenols, and ketones. However, these various metal compounds generally have the disadvantage of tending to corode alloy bearings, such as the cadmium-silver and copper-lead bearings now so widely used in automotive engines; and this is especially true in engines which operate at relatively high speeds and high temperatures. It is one of the primary objects of the present invention to provide a new class of addition agents for oils which are to be used as crankcase lubricants for internal combustion engines and which are unusually effective in promoting engine cleanliness, reducing ring sticking, varnish formation, and the like, and which do not exhibit the corrosion promoting tendencies characteristic of the above metal compounds. It is another object to provide a new class of agents which will be effective in inhibiting the normal deterioration of organic materials generally when the same are exposed to oxidation.

The new class of lubricating oil addition agents and anti-oxidants for organic materials, which have been found in accordance with the present invention to possess an unusual capacity to promote engine cleanliness when introduced into crankcase motor oil, comprises metal derivatives of aromatic compounds having two different substituent groups containing replaceable hydrogen, one of such groups being a hydroxyl or sulfhydryl group or similar group containing selenium or tellurium, and the second group being an inorganic acid radical, such as a sulfonate, sulfate, sulfite, phosphate, phosphite, phosphonate, phosphonite, phosphinate or phosphinite radical. The latter group may be either attached directly to the aromatic nucleus or connected through a hydrocarbon radical. The hydrogen atoms of both types of groups are substituted by polyvalent metals. There may be present more than one of each type of group.

For simplicity of nomenclature the metal salts of the present invention will be referred to hereafter as metal double salts, say of alkylated phenol sulfonic acids, alkylated phenol phosphoric acids, and the like.

The new class of additive compounds may be defined more precisely as those which possess the structure—

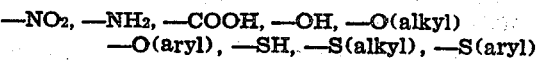

in which Ar is an aromatic nucleus which may, for illustration, be a single benzene ring, a diphenyl nucleus or a naphthalene nucleus, X is oxygen, sulfur, selenium or tellurium, R is a branched chain alkyl radical, Y is a hydrocarbon group, Z is sulfur or phosphorus, M and M' are polyvalent metals which may be the same or different metals and are preferably selected from groups II, III and VIII and the right-hand column of group IV of the periodic table, $n$, $m$ and $q$ are small whole numbers, $p$ is an integer from 1 to 3, and $o$ is zero or 1. Y in the above formula may be an alkyl, aryl, alkaryl or aralkyl group, if present in the compound. The more preferred compounds have the group $ZX_pM'$ attached directly to the nucleus. It is to be understood that valences of M and M' unsatisfied by the above defined group are to be joined to other similar groups, and that unsatisfied valences of the element represented by Z may be joined also to other similar groups or to hydroxy, alkoxy or aroxy radicals. It is to be further understood that the above formula represents also compounds in which there may be one or more substituent atoms or groups joined to the aromatic nucleus or nuclei. Such atoms and groups may include, for example, halogens, —NO₂, —NH₂, —COOH, —OH, —O(alkyl)
—O(aryl), —SH, —S(alkyl), —S(aryl)

and the like.

When the salts of interest in the present invention are to be incorporated in mineral lubricating oils, it is desirable that alkyl groups totaling at least eight carbon atoms be substituted in the aromatic nucleus in order to impart sufficient oil solubility to the material. However, if the alkyl groups are of the straight chain type only a narrow range of chain length may be chosen, i. e., about 8 to 18 carbon atoms. Straight chain alkyl groups of more than 18 carbon atoms, such as those introduced by alkylating the phenols with paraffin wax, impart undesirable characteristics to the metal derivatives so that they have only a slightly beneficial effect in improving the engine performance of crankcase lubricants to which they have been added. On the other hand, alkyl groups of this same general size but of the branched chain type are not objectionable from this standpoint. For this reason, the most preferred compounds of the present invention are metal double salts as defined above in which the alkyl groups are of the branched chain type and particularly those in which the total number of carbon atoms in the alkyl chains is at least 8 and preferably from 8 to 24.

An important class of compounds falling within the above general definition and readily prepared by methods to be described below are the metal double salts of sulfonated phenols, thiophenols and the like, defined by the formula—

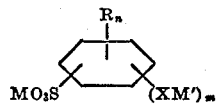

where M and M' are metals selected from groups II, III, VIII and the right-hand column of group IV of the periodic table, X is a member of the class consisting of oxygen, sulfur, selenium and tellurium, R is a branched chain alkyl radical, and $m$ and $n$ are small whole numbers, the total number of carbon atoms in all of the R groups being at least 8.

Branched chain alkyl groups of the desired type may be conveniently introduced by use of olefin polymers as the alkylating material. The dimer, trimer, tetramer and pentamer of isobutylene are particularly desirable alkylating agents. One of the most readily obtainable materials is the dimer, which gives satisfactory solubility by introducing a tetramethylbutyl group.

Other alkylating agents which may be used are certain of the polymeric materials obtained as by-products in the manufacture of butyl alcohol from petroleum refinery butenes. These consist essentially of polymers of n-butene with small percentages of isobutene and other olefins and may contain an average of 16–20 or 20–24 carbon atoms.

Low molecular weight polymers of other olefins such as ethylene, propene, pentene and isopentene or of mixtures of these may also be utilized to alkylate the phenols and other aromatic compounds used in accordance with this invention. The terpenes, being of a non-straight-chain nature, may also serve as suitable alkylating agents.

Among the more preferred starting materials in the preparation of the prefered addition agents are phenol, cresol, tert.-butyl phenol, petroleum phenols, naphthols and the like.

One of the more preferred classes of compounds used in accordance with this invention comprises the metal double salts of alkylated and sulfonated phenol and thiophenol sulfides, in which both the sulfonic acid and hydroxyl or sulfhydryl radicals are substituted by metals. The most common group of these compounds may be represented, in a case where the metal substituent of the phenolic groups is a divalent metal, by the following formula:

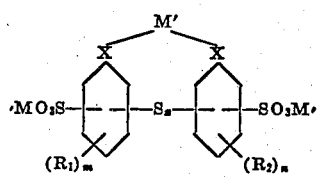

where M and M' are the same or different metals selected from the above-mentioned groups; $R_1$ and $R_2$ are branched chain alkyl radicals; X is oxygen, sulfur, selenium or tellurium; and $m$, $n$ and $x$ are small whole numbers; and where the total number of carbon atoms in all of the radicals $R_1$ and $R_2$ is not less than 16.

Thus, for example, we may use the barium double salt of isododecyl phenol sulfide sulfonic acid in which barium is linked to both the SO₃H and OH groups. This product may be represented as—

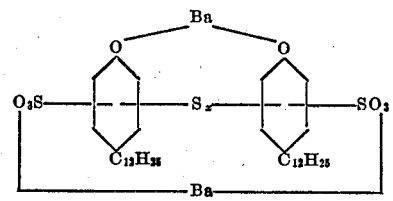

Also, there may be used the metal salts of the sulfonic acids produced by sulfonating the condensation products of aldehydes with alkylated phenols or with alkylated phenol sulfides.

As has been stated above, the metals suitable for forming the metal double salts of the present invention include the polyvalent metals, preferably selected from groups II, III and VIII, and the right hand column of group IV of the periodic table. Especially suitable are the salts of calcium, barium, strontium, magnesium, zinc, tin, aluminum, cobalt and nickel, the salts of group II metals, and particularly the alkaline earth salts, being the most preferred. It is to be understood that in a given compound the same metal atom may be attached to the inorganic group and to the oxygen or sulfur which is attached to the nucleus, or different atoms of the same or different metals may be attached to these groups. Thus, in the latter instance, we may use a metal salt in which a hydroxyl hydrogen has been replaced by barium and a sulfonic acid hydrogen by zinc.

Below are given a number of the formulas illustrating various types of compounds included within the scope of the present invention and illustrating various ways in which the metal atoms are attached to various groups and to various molecules. These formulas should be considered as illustrative only and not as limiting the scope of the invention. In these formulas R and R' represent branched chain alkyl groups, M and M' represent metals selected from the classes disclosed above, and $x$ represents a small whole number.

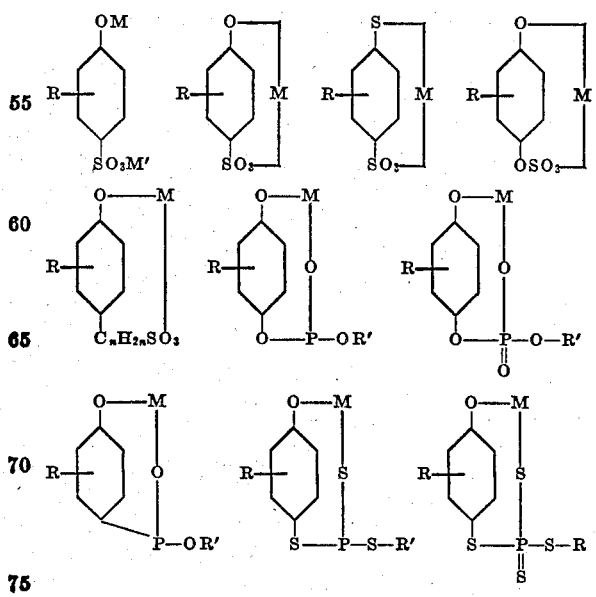

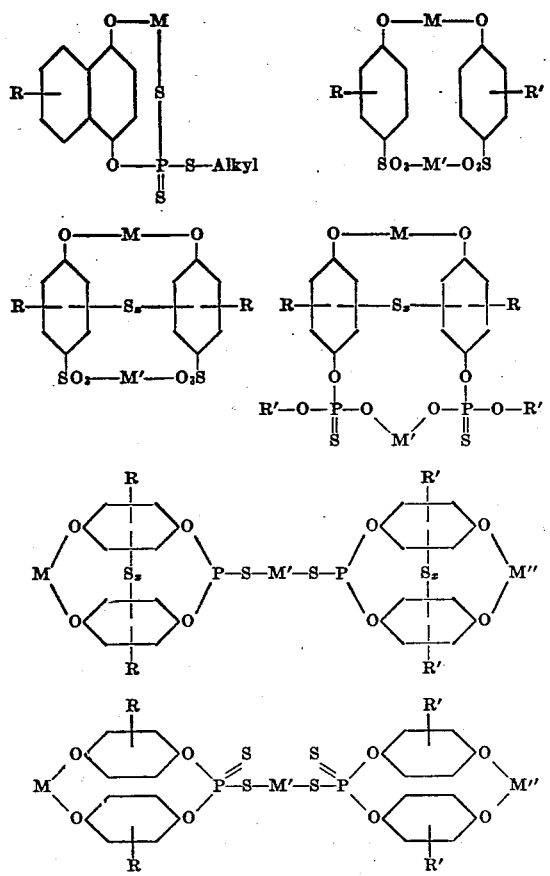

Below are listed several specific compounds which have been found especially suitable for use in accordance with the present invention. Throughout the present specification the prefix "iso" is used to indicate a branched chain group without designation of the position or degree of branching.

Compounds illustrating the invention are: the calcium double salt of isododecyl phenol sulfonic acid, the barium double salt of isohexadecyl phenol sulfonic acid, the calcium double salt of a phenol sulfonic acid in which the phenol has been alkylated with a $C_{16}$-$C_{20}$ polymer of essentially n-butene, the mixed barium-zinc double salt of isoeicosyl phenol sulfonic acid, the calcium double salt of isohexadecyl phenol sulfonic acid, the tin double salt of isododecyl cresol sulfonic acid, the barium double salt of di-tert.-amyl phenol sulfonic acid, the calcium-zinc double salt of isododecyl hydroxyphenyl propane sulfonic acid, the calcium-barium double salt of bis(di-isohexyl phenol monothiophosphoric-acid) sulfide, the calcium double salt of tetramethylbutyl phenol phosphoric acid, and the aluminum double salt of bis(isohexadecyl phenol sulfuric acid) sulfide.

Phenol sulfonic acids to be used in the present invention may be prepared by reacting a phenol with an olefin or olefin polymer in a hydrocarbon oil solution, while gradually adding sulfuric acid under controlled temperature conditions. In this method of preparation the sulfuric acid serves both as an alkylation catalyst and as a sulfonating agent. An alternative procedure is first to alkylate the phenol in the presence of a different catalyst and then sulfonate the alkylated phenol with sulfuric acid. Thus phenol can be alkylated with diisobutylene (the dimer of isobutylene) in the presence of stannic chloride and HCl, or with a mixed butene polymer of 16 to 20 carbon atoms, using an $AlCl_3$-HCl catalyst. The alkyl phenol is then sulfonated as described above.

In order to prepare metal double salts of the alkyl phenol sulfonic acids, it is often desirable to prepare the sodium salts first and then convert these to barium, zinc, calcium, and other polyvalent metal salts by reaction with a solution of an appropriate inorganic salt. To obtain a good yield of calcium double salt the phenol sulfonic acids may be neutralized with aqueous sodium hydroxide to make the mono sodium sulfonate, which is then converted to the sodium double salt with alcoholic NaOH, and the double salt treated with calcium nitrate in acetone to give the calcium double salt of the alkyl phenol sulfonic acid.

It is also possible in the above method to convert the mono sodium salt to the sodium double salt by dissolving it in xylene and treating it with finely divided solid NaOH, the water of formation being removed from the reaction by suitable means.

By an alternative procedure the alkyl phenol sulfonic acid may be neutralized directly to the sodium double salt with alcoholic sodium hydroxide and this salt then converted to the calcium double derivative with calcium chloride in alcohol.

To prepare a double salt of an alkylated phenol thiophosphoric acid, say the barium-zinc double salt of isododecyl phenol dithiophosphoric acid, hydroquinone may be used as the starting material. This is first alkylated with triisobutylene to give isododecyl hydroquinone and the product is then partly neutralized with sodium hydroxide to give the sodium mono salt of the alkylated phenol. The sodium salt is then converted to the barium mono salt by double decomposition with a suitable inorganic barium salt. The latter is then treated with $P_2S_5$ and zinc oxide to give the desired barium-zinc double salt of isododecyl phenol dithiophosphoric acid.

The following examples will illustrate the preparation and testing of some of the metallic salts used in accordance with the present invention, although it should be understood that these examples do not limit the scope of the invention in any way.

EXAMPLE 1

PREPARATION OF MONO-SODIUM ISOHEXADECYL PHENOL SULFONATE 296 grams of phenol, 650 grams of tetraisobutylene and 1800 cc. of light petroleum naphtha (boiling range 160°–240° F.) were placed in a reaction vessel equipped with a stirrer and reflux condenser. 624 grams of 96% sulfuric acid were added dropwise to this mixture and the temperature kept below 35° C. After 8 hours of contact with the mixture, the spent acid was withdrawn and 300 grams of additional 96% sulfuric acid were contacted with the reaction mixture for another 8 hours. The spent acid was again removed and about half of the sulfonic acid product was neutralized with a 30% aqueous-isopropanol solution of sodium hydroxide. The resulting material was dried on a drum drier, yielding 720 grams of a soft product. This was dissolved in 2 liters of 50% isopropanol and extracted several times with light petroleum naphtha. The soap layer was removed and dried on a drum drier, yielding 650 grams of sodium isohexadecyl phenol sulfonate. This was further purified by dissolving in light petroleum naphtha and filtering and drying, yielding 459 grams of purified product.

EXAMPLE 2

PREPARATION OF CALCIUM DOUBLE SALT OF ISOHEXADECYL PHENOL SULFONIC ACID

A solution of 160 grams of monosodium isohexadecyl phenol sulfonate (prepared as in Example 1) in 500 cc. of xylene was placed in a reaction vessel equipped with a stirrer and a reflux condenser attached to a water trap. 16 grams of finely divided sodium hydroxide were added and the mixture refluxed with stirring for 2 hours, water of reaction being removed through the trap. The reaction mixture was then evaporated to dryness at 100° C. under 3 mm. pressure. The residue was taken up with 500 cc. of acetone and to this was added an acetone solution of 75 grams of calcium nitrate. The resulting precipitate was removed by filtration, and the filtrate was evaporated to dryness at 100° C. under 3 mm. pressure. There were thus obtained 152 grams of residue, which was the desired product. It was found to contain 9.05% calcium. The calculated value for the calcium double salt is 9.15% calcium.

EXAMPLE 3

BEARING CORROSION TESTS

For purposes of comparison, tests were made of the corrosiveness of a lubricating oil blend containing an additive illustrative of the present invention, as well as of the base oil without the additive, the base oil being a well-refined, solvent extracted paraffinic type mineral lubricating oil of S. A. E. 20 viscosity grade. The additive used was the calcium double salt of isohexadecyl phenol sulfonic acid prepared as described in Example 2. The tests were conducted as follows:

500 cc. of the oil to be tested were placed in a glass oxidation tube (13" long and 2⅝" in diameter) fitted at the bottom with a 1¼" bore air inlet tube perforated to facilitate air distribution. The oxidation tube was then immersed in a heating bath so that the oil temperature was maintained at 325° F. during the test. Two quarter sections of the automotive bearings of copper-lead alloy of known weight having a total area of 25 sq. cm. were attached to opposite sides of a stainless steel rod which was then immersed in the oil and rotated to provide sufficient agitation of the sample during the test. Air was then blown through the oil at the rate of 2 cu. ft. per hour. At the end of four hours the bearings were removed, washed with naphtha and weighed to determine the amount of loss by corrosion. The bearings were then repolished to increase the severity of the evaluation and the test conducted for another four-hour period, when they were again washed and weighed. The results show the cumulative weight loss of the bearings at the end of each four-hour period.

The results of the tests are shown in Table I.

Table I

| Oil | Cumulative bearing weight loss, mg./25 sq. cm. | |
|---|---|---|
| | 4 hours | 8 hours |
| Base oil | 5 | 181 |
| Base oil+0.25% additive | 2 | 30 |

EXAMPLE 4

DIESEL ENGINE TESTS

In the following tests the base oil consisted of a solvent extracted Mid-continent paraffinic oil of 52 seconds Saybolt viscosity at 210° F. The base oil and blends of the same with 1% of mono-calcium isohexadecyl phenol sulfonate (prepared as described in copending application Serial No. 470,453, Example 8) and with 1% of the double calcium salt of isohexadecyl phenol sulfonic acid (prepared as in Example 2) were tested in a single cylinder Caterpillar Diesel engine run under high temperature, high load conditions, namely, 18.7 B. H. P. output, 850 R. P. M., 195° F. oil temperature and 140° F. air temperature, for 60-hour periods. After each test was completed, the engine was taken down and the parts examined and given demerit ratings based on their condition. The individual ratings were weighted according to their relative importance and an overall rating calculated from them. It should be pointed out that the lower the demerit rating the better the engine condition, and hence the better the oil performed in the engine. The results obtained are given in Table II.

Table II

| Oil | Engine demerits | | | | | | Cu-Pb connecting rod bearing weight loss (mg.) |
|---|---|---|---|---|---|---|---|
| | Overall | Ring zone | Ring grooves and sides | | Rings stuck | Piston skirts | |
| | | | #1 and #2 | #4 and #5 | | | |
| Base oil | 1.46 | 1.55 | 14.00 | 7.00 | 1 | 1.0 | 82 |
| Base oil+1% mono-calcium isohexadecyl phenol sulfonate | .75 | .63 | 4.50 | 2.50 | 0 | 0 | 31 |
| Base oil+1% calcium double salt of iso-hexadecyl phenol sulfonic acid | .57 | .39 | 3.00 | 1.00 | 0 | 0 | 45 |

It can be seen from the results of Example 4 that the salt representative of the present invention was remarkably effective in promoting cleanliness in the engine under operating conditions and was considerably more effective than the corresponding salt in which the hydroxyl group was not substituted by a metal. This is particularly to be noted in the ring zone and the ring groove demerits, the values representing unusually clean conditions in the case of the test with the blend of the calcium double salt. The results of the bearing corrosion tests (Example 3) also show that the preferred additives have good corrosion inhibiting qualities.

The lubricating oil base stocks in which the additives of this invention may be used include straight mineral lubricating oils or distillates derived from paraffinic, naphthenic, asphaltic or mixed base crudes, or, if desired, various blended oils may be employed as well as residuals, particularly those from which asphaltic constituents have been removed. The oils may be refined by conventional methods using acid, alkali and/or clay or other agents such as aluminum chloride, or they may be extracted oils produced, for example, by solvent extraction with solvents of the type of phenol, sulfur dioxide, furfural, dichloroethyl ether, propane, nitrobenzene, crotonaldehyde, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coal tar fractions and coal tar or shale oil distillates may also be used. Also, for special applications, animal, vegetable or fish oils or their hydrogenated or voltolized products may be employed, either alone or in admixture with mineral oils.

For the best results the base stock chosen should normally be that oil which without the new additives present gives the optimum performance in the service contemplated. However, since one advantage of the additives is that their use also makes feasible the employment of less satisfactory mineral oils or other oils, no strict rule can be laid down for the choice of the base stock. Certain essentials must of course be observed. The oil must possess the viscosity and volatility characteristics known to be required for the service contemplated. The oil must be a satisfactory solvent for the additive, although in some cases auxiliary solvent agents may be used. The lubricating oils, however they may have been produced, may vary considerably in viscosity and other properties depending upon the particular use for which they are desired, but they usually range from about 40 to 150 seconds Saybolt viscosity at 210° F. For the lubrication of certain low and medium speed Diesel engines the general practice has often been to use a lubricating oil base stock prepared from naphthenic or aromatic crudes and having a Saybolt viscosity at 210 F. of 45 to 90 seconds and a viscosity index of 0 to 50. However, in certain types of Diesel service, particularly with high speed Diesel engines, and in gasoline engine service, oils of higher viscosity index are often preferred, for example, up to 75 or 100, or even higher, viscosity index. For aviation engine lubrication oils of up to 140 seconds Saybolt often find employment.

In addition to the materials to be added according to the present invention, other agents may also be used such as dyes, pour depressors, heat thickened fatty oils, sulfurized fatty oils, organo metallic compounds, metallic or other soaps, sludge dispersers, antioxidants, thickeners, viscosity index improvers, oiliness agents, resins, rubber, olefin polymers, voltolized fats, voltolized mineral oils, and/or voltolized waxes and colloidal solids such as graphite or zinc oxide, etc. Solvents and assisting agents, such as esters, ketones, alcohols, aldehydes, halogenated or nitrated compounds, and the like, may also be employed.

Assisting agents which are particularly desirable are the higher alcohols having eight or more carbon atoms and preferably 12 to 20 carbon atoms. The alcohols may be saturated straight and branched chain aliphatic alcohols such as octyl alcohol, $C_8H_{17}OH$, lauryl alcohol, $C_{12}H_{25}OH$, cetyl alcohol, $C_{16}H_{33}OH$, stearyl alcohol, sometimes referred to as octadecyl alcohol, $C_{18}H_{37}OH$, and the like; the corresponding olefinic alcohols such as oleyl alcohol; cyclic alcohols, such as naphthenic alcohols; and aryl substituted alkyl alcohols, for instance, phenyl octyl alcohol, or octadecyl benzyl alcohol or mixtures of these various alcohols, which may be pure or substantially pure synthetic alcohols. One may also use mixed naturally occurring alcohols such as those found in wool fat (which is known to contain a substantial percentage of alcohols having about 16 to 18 carbons atoms) and in sperm oil (which contains a high percentage of cetyl alcohol); and although it is preferable to isolate the alcohols from those materials, for some purposes, the wool fat, sperm oil or other natural products rich in alcohols may be used per se. Products prepared synthetically by chemical processes may also be used such as alcohols prepared by the oxidation of petroleum hydrocarbons, e. g., paraffin wax, petrolatum, etc.

In addition to being employed in crankcase lubricants, the additives of the present invention may also be used in extreme pressure lubricants, spindle oils, textile oils, metal cutting oils, engine flushing oils, turbine oils, insulating and transformer oils, steam cylinder oils, slushing compositions and greases, in all of which materials they serve to prevent deterioration due to oxidation. Also their use in motor fuels, Diesel fuels and kerosene is contemplated. Since these additives exhibit antioxidant properties and are believed also to possess ability to modify surface activity, they may be employed in asphalts, road oils, waxes, fatty oils of animal or vegetable origin, soaps, and plastics. Similarly, they may be used in natural and synthetic rubber compounding both as vulcanization assistants and as antioxidants and generally they may be used in any organic materials subject to deterioration by atmospheric oxygen.

The new additives are also useful as wetting agents to promote the spreading of oils and their adhesion to metals; they also peptize solids and thus serve as detergents in oils and as pigment dispersers in paints and the like. When the additives contain alkaline earth metals, they also serve as neutralizing agents for corrosive acids which may be present in oils or other organic materials containing the additives. This property aids in the protection of engine bearings, combustion chamber surfaces, etc.

The present invention is not to be considered as limited by any of the examples described herein which are given by way of illustration only, but it is to be limited solely by the terms of the appended claims.

We claim:

1. A composition of matter comprising a hydrocarbon oil subject to deterioration at elevated temperatures and a small proportion, sufficient to substantially stabilize said oil at such elevated temperatures of a compound having the formula—

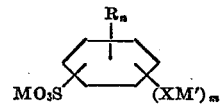

where M and M' are metals selected from groups II, III, VIII and the right-hand column of group IV of the periodic table, X is a member of the class consisting of oxygen, sulfur, selenium, and tellurium, R is a branched chain alkyl radical, and $m$ and $n$ are small whole numbers whose sum is not greater than 5, the total number of carbon atoms in all of the R groups being at least 8.

2. A composition according to claim 1 in which M and M' of the formula represent alkaline earth metals.

3. A composition according to claim 1 in which $n$ of the formula is 1, the group R having 8 to 24 carbon atoms.

4. A composition of matter comprising a hydrocarbon oil subject to deterioration at elevated temperatures and a small proportion, sufficient to substantially stabilize said oil at such elevated temperatures of a compound having the formula—

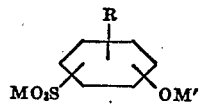

where M and M' are metals selected from Groups II, III and VIII and the right-hand column of group IV of the periodic table and R is a branched chain alkyl radical having from 8 to 24 carbon atoms.

5. A composition according to claim 4 in which the group R has 16 carbon atoms.

6. A composition according to claim 4 in which M and M' of the formula represent calcium.

7. A composition according to claim 4 in which M and M' of the formula represent calcium and in which the group R is an alkyl group derived from tetraisobutylene.

8. A crankcase lubricant for internal combustion engines comprising a mineral oil base of the lubricating oil range and a small amount, sufficient to substantially stabilize said mineral oil base, of the calcium double salt of isohexadecyl phenol sulfonic acid.

JOHN G. McNAB.
CARL WINNING.